United States Patent Office

3,011,892
Patented Dec. 5, 1961

3,011,892
METHOD OF MANUFACTURING HIGH MELTING DIGESTIBLE FAT COMPONENTS OF FEEDS
Adolf Rosenberg, Forest Hills, N.Y., assignor to Commercial Solvents Corporation, a corporation of Maryland
No Drawing. Filed Aug. 4, 1958, Ser. No. 753,080
6 Claims. (Cl. 99—2)

This invention relates to animal feeds. In particular, it is directed to a convenient, readily utilizable fat for inclusion in feeds, the methods of manufacturing the same, and the feeding therewith.

It has been shown that fats improve the nutritional value of animal rations; and hence are being used widely today as components of animal feeds. Those fats are low-melting tallows and greases. They are first of all melted and then sprayed on the feed particles to obtain a uniform distribution in the feed. This practice adds to the cost of feed manufacture, inter alia, in (a) requiring accessory equipment, such as, insulated holding tanks equipped with agitators and heating elements, pumps, pipe lines, spray nozzles, specialized mixers, and (b) requiring substantial expenditures for labor in order to ensure uniformity of distribution of the sprayed-on fat.

Hydrogenated fats of high-melting point, particularly in the form of flakes or particles, can be handled much more readily in plants manufacturing the feeds. The incorporation of such particles with the other feed materials can be easily accomplished by the use of conventional mixers. However, the hydrogenated fats of high-melting point which offer the conveniences of uniform distributability are not used because of the fact that the livestock has extreme difficulty in digesting such fats. Studies on chicks by Carver and associates, Poultry Science, vol. 34, p. 544 (1955), have shown that only 11 to 58 percent of hydrogenated tallow (M.P.=58° C.) in the ration is nutritionally utilized, whereas in contrast thereto unhydrogenated tallow (M.P.=48° C.) is utilized to the extent of from 80 to 100 percent. Carver and his associates also report (ibid.) that the mixing of the two tallows together fails to improve the utilization of the high-melting component.

I have discovered that it is possible to provide fat particles having a high melting point which provides the fat in nutritionally available form.

Accordingly, it is among the principal objects of this invention to provide a fat in particulate form based on hydrogenated fat, for easy mixing with other feed components, the fat being readily available to the animal for nutritional purposes.

Another object of this invention is to provide processes for the manufacture of the just mentioned fat particles of high-melting point.

Deuel in his book "The Lipids," vol. II: Biochemistry, Interscience Publishers, New York, 1955, points out that vegetable and animal fats which melt at tempartures up to 50° C. are readily utilized for nutritional purposes, whereas those melting above 50° C. suffer in digestibility at a progressively greater rate as the melting point of the fat increases.

Before a fat can be flaked to yield particles which remain discrete entities during manufacture, shipment and storage, and after admixture with the other components of feed, the fat must have a melting point of at least 52° C., and preferably at least 54° C.

As I have mentioned, I have discovered that it is now possible to make discrete flakes of fat containing hydrogenated fats, such as hydrogenated tallow having a high-melting point and characterized by the feature that it provides full nutritional availability of the fat.

I have further discovered that it is not sufficient, indeed it is even misleading, to identify the fat flakes of this invention merely by reference to the melting point thereof. It is possible to produce two types of fat flakes having the same melting point, and to find that the nutritional availability to the animal, as for example, the chick, of one fat is very low and that of the other is very high. These two distinct and separate fats show other distinguishing characteristics. The iodine value of the fat product providing the more nutritionally available fat will be significantly greater than that of the other fat product; and the fatty acid radicals will be distributed in non-randomized order.

The novel fat particles or flakes of the present invention is prepared from molten fat having the following characteristics:

(1) A melting point of from about 52° C. to 65° C., preferably in the range of about 54° C. to 60° C.;

(2) An iodine value of from about 15 to 55, preferably in the range of about 25 to 50; and (3) The fatty acid radicals are present in a non-random distribution.

The novel fat product of this invention is further characterized by the fact that it is a blend of: (1) one or more high-melting fats obtained by completely or almost completely hydrogenating the fat, with (2) one or more liquid oils that have not been hydrogenated. The high-melting fat component of the instant novel fat product may be a highly hydrogenated vegetable oil (such as, cottonseed, soybean, peanut or corn oils, etc.), a highly hydrogenated animal fat or oil (land or marine), such as lard, tallow, sardine, menhaden, cod liver, pilchard, halibut, etc. The high-melting component of the novel fat product of this invention has a melting point of about 54° C. to 70° C. and an iodine value of about 0 to 6; and the fatty acid radicals thereof are present in a random distribution.

The high-melting component of the fat product of this invention comprises about 65 to 90 percent of the product. The remainder (35 to 10 percent) comprises the non-hydrogenated liquid oil. These oils may be the unhydrogenated, vegetable oils (such as peanut, cottonseed, corn, soybean, linseed, etc.) or the marine oils (such as, sardine, menhaden, cod liver or halibut, etc.). The liquid oil component of the novel fat product of this invention has an iodine value of about 90 to 200 and the fatty acid radicals thereof are in a non-random or random distribution.

The blending of the high-melting component with the liquid oil produces a fat blend with the fatty acid redicals present in a non-random distribution. When such fat blends are subjected to interesterification procedures, according to any one of the established methods (Deuel, The Lipids, volume I: Chemistry, Interscience Publishers, New York, 1951), using preferably sodium methylate as a catalyst, there occurs a redistribution of the fatty acid radicals whereby they become present in the triglycerides in a randomized order. This is associated with a drop in the melting point of the fat blend from its original value of from about 52° C.– 65° C. to about 45° C.–50° C. In many ways the interesterified fat simulates a straight hydrogenated fat of the same iodine value, and such fats are nutritionally available to a high degree.

It is my hypothesis that the novel fat blends of my invention during digestion by the chick (or other farm animal) release their fatty acids in patterns which are the same as those following the digestion of the same fats after interesterification in vitro. In other words, the novel fat blends retain their high-melting points and the fat flakes retain their discrete appearance during manufacture, shipment and incorporation into feeds. After ingestion, however, they release in vivo a pattern of fatty acids associated with nutritional availability, about 70 to 95 percent. The same fat blend after interesterification, or a straight hydrogenated fat of the same iodine value and same melting point, would not yield satisfactory discrete fat flakes for use as feed supplements. Straight hydrogenation of a given fat to such a high degree (viz., iodine value of 3–10) as to provide a fat of melting point of 52° C.–65° C., results in a fat having the fatty acid radicals present in a random distribution; following the interesterification reaction, the melting point of such a fat does not change. This type of fat would provide discrete flakes which are physically acceptable, but nutritionally unacceptable since this fat exhibits a low degree of digestibility, of about 10 to 60 percent. Thus, only by using the fat blends of the present invention is it possible to provide discrete fat flakes which are commercially acceptable and at the same time fat of high nutritional value.

The process of making the fat flakes of the present invention involves melting the fat blend by heating it to a temperature above the melting point of the high-melting component, viz., about 5° C. to 15° C. above such melting point, passing the fat stream over a chilled surface, such as the conventional chill-roll, scraping off the chilled set-up fat, and breaking the set-up fat to yield flakes of convenient size. The flakes may be up to 2 mm. in thickness and up to 10 mm. in diameter, preferably up to 1 mm. in thickness and up to 5 mm. in diameter. Size of the fat flakes is not critical since the flakes are brittle and fracture on admixture with the other ingredients in preparing the feed. Flakes may also be prepared by scraping the fat in thin layers from a rapidly set-up solid block of the fat. Beads of the novel fat may likewise be prepared by spray-chilling of the molten blend to yield particles of 2 mm. or less in diameter. If the above-mentioned fat products are to be stored for extended periods of time, they may exhibit some indications of rancidity. Under such circumstances, it may be desirable, at the time of manufacturing the particles, to incorporate in the blend of fat and oil antioxidants of the true phenolic type, such as butylated hydroxyanisole, butylated hydroxytoluene, and/or propyl gallate. They may be added to the molten fat with or without added suitable metal chelating agents, e.g., citric acid, and/or ethylenediamine tetra-acetic acid, and others.

The following examples prepared in accordance with the present invention, demonstrate the advantages of the novel fats of the present invention. Digestibility of the fats by the chick was determined according to the procedure described by Carver and Associates, Poultry Science, vol. 34, p. 544 (1955).

*Example 1*

To 70 parts of molten, almost completely hydrogenated soybean oil with a melting point of 68° C. and an iodine value of 2 are added 30 parts of menhaden oil of 160 iodine value. The resulting blend has an iodine value of 49 and a melting point of 60° C., and the fatty acids are present in non-random distribution in the triglycerides. The blend is heated to a temperature of 75° C. and the fat stream passed over a chill-roll to provide discrete fat flakes of less than 1 mm. in thickness and less than 5 mm. in diameter. On biological assay for digestibility, the fat is found to be absorbed to the extent of 82 percent.

A 70:30 blend of limpid soybean oil and menhaden oil hydrogenated to an iodine value of 49 has the same coefficient of digestibility but fails to yield satisfactory discrete fat flakes since the fat has a melting point of only 49° C. A 70:30 blend of limpid soybean oil and menhaden hydrogenated to an iodine value of 12 has a melting point of 61° C. This fat yields discrete fat flakes but these flakes are unacceptable since the fat is digested to the extent of only 35 percent.

*Example 2*

To 75 parts of molten almost completely hydrogenated tallow with a melting point of 58° C. and an iodine value of 3 are added 25 parts of limpid cottonseed oil of 112 iodine value. The resulting blend has an iodine value of 30 and a melting point of 56° C. and the fatty acids are present in a non-random distribution in the triglycerides. The blend is heated to a temperature of 70° C. and then passed over a chill-roll to provide discrete fat flakes of less than 1 mm. in thickness and less than 5 mm. in diameter. On biological assay, the fat was found to be absorbed from the digestive tract to the extent of 76 percent.

*Example 3*

This duplicates Example 2 with the exception that the high-melting component is almost completely hydrogenated cottonseed oil with the same melting point and iodine value noted with the hydrogenated tallow of Example 2. The resulting fat flakes are identical to those of Example 2 in melting point, iodine value, discrete particulate form, and in nutritional availability.

*Example 4*

To 83 parts of molten almost completely hydrogenated sardine oil with a melting point of 68° C. and an iodine value of 6 are added 15 parts of linseed oil of 190 iodine value, 1 part of butylated hydroxytoluene, and 1 part of propyl gallate. The resulting blend has an iodine value of 34 and a melting point of 64° C. and the fatty acids are present in non-random distribution. The blend is heated to 75° C. and the fat spray-chilled to yield beads of less than 1 mm. in diameter. On biological assay for digestibility, the fat is found to be absorbed to the extent of 71 percent.

*Example 5*

To 68 parts of molten almost completely hydrogenated tallow with a melting point of 58° C. and an iodine value of 3 are added 30 parts of menhaden oil of 160 iodine value, 1.0 part of butylated hydroxytoluene, 0.5 part of propyl gallate and 0.5 part of ethylenediamine tetra-acetic acid. The resulting blend has an iodine value of 50 and a melting point of 55° C. and the fatty acids are present in a non-random distribution. The blend is heated to a temeprature of 70° C. and then passed over a chill-roll to provide discrete flakes of less than 1 mm. in thickness and less than 5 mm in diameter. On biological assay, the fat is found to be absorbed from the digestive tract to the extent of 88 percent.

*Example 6*

To 70 parts of molten almost completely hydrogenated tallow with a melting point of 58° C. and an iodine value of 3 are added 30 parts of cod liver oil of 164 iodine value. The resulting blend has an iodine value of 51 and a melting point of 55° C. and the fatty acids are present in a non-random distribution. The blend is heated to a temperature of 70° C. and then passed over a chill-roll to provide discrete flakes of less than 1 mm. in thickness and less than 5 mm. in diameter. On biological assay, the fat is found to be absorbed from the digestive tract to the extent of 85 percent.

A blend of 70 parts of natural tallow and 30 parts of cod liver oil is prepared, and the molten blend is hydrogenated to an iodine value of 51. The hydrogenated blend has a satisfactory coefficient of digestibility of 83 percent, but fails to yield satisfactory fat flakes since the fat has a melting point of only 48° C. When a 70:30 blend of natural tallow and cod liver oil is hydrogenated to an iodine value of 12 the blend has a melting point of 60° C. This fat yields discrete fat flakes but these flakes are unacceptable since the fat is absorbed to the extent of only 39 percent. The results obtained with these control systems again emphasize the novelty of the fat products of the present invention.

It will be observed accordingly that the instant invention, in its fundamental aspects, involves the manufacture of high melting fat particles, which are readily digestible by blending molten hydrogenated fat or oil having an iodine value of about 0 to 6 and with a melting point of about 54 to 70° C. with an oil having an iodine value of about 90 to 200, and then rapidly chilling said blend so as to obtain a rapid setup thereof and fragmentizing the setup substance into small particles.

It will be understood that the foregoing description of this invention and the exemplary embodiments set forth are merely illustrative of the principles thereof; and, accordingly, that the appended claims are to be construed as defining the invention within the full spirit and scope thereof.

I claim:

1. Method of manufacturing high melting digestible fat particles for use as components of feeds, which consists in blending (1) from 65 to 90 parts of a member of the group consisting of molten hydrogenated fat and oil having an iodine value of about 0 to 6 and a melting point of about 54° to 70° C. and (2) about 35 to 10 parts of a non-hydrogenated oil having an iodine value of about 90 to 200, heating said blend to a temperature of about 5° to 15° C. above the melting point of said hydrogenated material, rapidly chilling said blend thereby rapidly to set-up the same and fragmentizing the obtained set-up substance into small particles.

2. Method of manufacturing high melting digestible fat particles for use as components of feeds, which consists in blending (1) from 65 to 90 parts of a member of the group consisting of molten hydrogenated fat and oil having an iodine value of about 0 to 6 and a melting point of about 54° to 70° C. and (2) about 35 to 10 parts of a non-hydrogenated oil having an iodine value of about 90 to 200, heating said blend to a temperature of about 5° to 15° C. above the melting point of said hydrogenated material, passing said molten blend over a chill roll and fragmentizing the chilled substance in the form of small particles.

3. Method of manufacturing high melting digestible fat particles for use as components of feeds, which consists in blending (1) from 65 to 90 parts of a member of the group consisting of molten hydrogenated fat and oil having an iodine value of about 0 to 6 and a melting point of about 54° to 70° C. and (2) about 35 to 10 parts of an oil having a non-hydrogenated iodine value of about 90 to 200, heating said blend to a temperature of about 5° to 15° C. above the melting point of said hydrogenated material, and spray chilling said molten blend thereby to obtain discrete particles of the set-up substance.

4. Method in accordance with claim 1 wherein the blend includes a metal sequestering agent.

5. Method in accordance with claim 1, wherein the blend includes an antioxidant.

6. Method in accordance with claim 1, wherein the blend includes a metal sequestering agent and an antioxidant.

References Cited in the file of this patent

UNITED STATES PATENTS

| | | |
|---|---|---|
| 1,831,164 | Dawe | Nov. 10, 1931 |
| 2,144,371 | Griffith et al. | Jan. 17, 1939 |
| 2,509,414 | Barsky | May 30, 1950 |

UNITED STATES PATENT OFFICE
CERTIFICATE OF CORRECTION

Patent No. 3,011,892  
December 5, 1961

Adolf Rosenberg

It is hereby certified that error appears in the above numbered patent requiring correction and that the said Letters Patent should read as corrected below.

Column 6, line 14, for "parts of an oil having a non-hydrogenated iodine value" read -- parts of a non-hydrogenated oil having an iodine value --.

Signed and sealed this 8th day of May 1962.

(SEAL)  
Attest:

ERNEST W. SWIDER  
Attesting Officer

DAVID L. LADD  
Commissioner of Patents